United States Patent
Gunter et al.

(10) Patent No.: US 12,352,153 B2
(45) Date of Patent: Jul. 8, 2025

(54) METHOD FOR DETECTION OF SCALE ON ESP USING DIFFERENTIAL TEMPERATURE MEASUREMENT

(71) Applicant: Baker Hughes Oilfield Operations LLC, Houston, TX (US)

(72) Inventors: Shawn Gunter, Owasso, OK (US); Ryan Semple, Owasso, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/444,677

(22) Filed: Feb. 17, 2024

(65) Prior Publication Data
US 2024/0280012 A1 Aug. 22, 2024

Related U.S. Application Data

(60) Provisional application No. 63/446,464, filed on Feb. 17, 2023.

(51) Int. Cl.
*E21B 43/12* (2006.01)
*E21B 47/00* (2012.01)
(Continued)

(52) U.S. Cl.
CPC .......... *E21B 47/006* (2020.05); *E21B 43/128* (2013.01); *E21B 47/07* (2020.05); *G01K 3/14* (2013.01)

(58) Field of Classification Search
CPC ....... E21B 43/128; E21B 47/006; E21B 47/07
See application file for complete search history.

(56) References Cited

U.S. PATENT DOCUMENTS

2017/0016312 A1 1/2017 Clarke et al.
2018/0051555 A1* 2/2018 Marvel ................... E21B 47/07
(Continued)

OTHER PUBLICATIONS

"International Search Report and Written Opinion for PCT/US2024/016327 mailed Jun. 13, 2024".

*Primary Examiner* — Matthew R Buck
(74) *Attorney, Agent, or Firm* — Baker Hughes Company (57) ABSTRACT

A method for operating an electric submersible pumping system includes the steps of operating the electric submersible pumping system until it reaches a steady state operating condition, obtaining a first internal motor temperature measurement, obtaining a first external motor temperature measurement, and determining a first temperature differential based on the difference between the first internal motor temperature measurement and the first external motor temperature measurement. The method continues with the steps of obtaining a second internal motor temperature measurement, obtaining a second external motor temperature measurement, and determining a second temperature differential based on the difference between the second internal motor temperature measurement and the second external motor temperature measurement. Next the method includes the steps of comparing the second temperature differential to the first temperature differential, and indicating a probability of scale accumulation on the electric motor if the second temperature differential is greater than the first temperature differential.

19 Claims, 4 Drawing Sheets

(51) Int. Cl.
*E21B 47/07* (2012.01)
*G01K 3/14* (2006.01)

(56) References Cited

U.S. PATENT DOCUMENTS

2018/0051700 A1   2/2018  Sheth et al.
2022/0003087 A1   1/2022  McMullen
2023/0399938 A1*  12/2023 Hernandez de la Bastida ............
                                                      E21B 47/00

* cited by examiner

METHOD FOR DETECTION OF SCALE ON ESP USING DIFFERENTIAL TEMPERATURE MEASUREMENT

RELATED APPLICATIONS

This application claims the benefit of U.S. Provisional Patent Application Ser. No. 63/446,464 filed Feb. 17, 2023 entitled, "Method for Scale Detection on ESP Using Differential Temperature Measurement," the disclosure of which is herein incorporated by reference.

FIELD OF THE INVENTION

This invention relates generally to the field of submersible pumping systems, and more particularly, but not by way of limitation, to a system and method for detecting the formation of scale on a submersible pumping system.

BACKGROUND OF THE INVENTION

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Typically, electricity is generated on the surface and supplied to the motor through a heavy-duty power cable. The power cable typically includes several separate conductors that are individually insulated within the power cable. Power cables are often constructed in round or flat configurations.

The wellbore fluids often contain high concentrations of dissolved minerals and salts, such as iron sulfides, calcium carbonates, paraffins, barium sulfates and silica-based complexes. Over time, these minerals for scale deposits on the outside of the electric submersible pumping system. In some cases, the accumulation of scale on the outside of the electric motor can decrease the effectiveness of convective cooling, which may lead to higher operating temperatures and premature failure. There is, therefore, a need for detecting the accumulation of scale on an electric motor so that remedial steps can be taken to avoid premature failure of the electric submersible pumping system. It is to these and other deficiencies in the prior art that the present invention is directed.

SUMMARY OF THE INVENTION

In one aspect, embodiments of the present disclosure are directed to an electric submersible pumping system configured to produce fluids from a well. The submersible pumping system has a motor drive, an electric motor driven by the motor drive, and a sensor module connected to the electric motor The pumping system further includes a first motor temperature sensor configured to monitor the internal temperature of the electric motor and a second motor temperature sensor configured to monitor the external temperature of the electric motor. The pumping system advantageously includes a processor configured to determine changes over time in a temperature differential calculated as the difference between the internal motor temperature and the external motor temperature, which may indicate excessive accumulation of scale on the outside of the motor.

In another aspect, embodiments of the present disclosure are directed to a method for operating an electric submersible pumping system that includes an electric motor and a motor drive. The method includes the steps of operating the electric submersible pumping system until it reaches a steady state operating condition, obtaining a first internal motor temperature measurement, obtaining a first external motor temperature measurement, and determining a first temperature differential based on the difference between the first internal motor temperature measurement and the first external motor temperature measurement. The method continues with the steps of obtaining a second internal motor temperature measurement, obtaining a second external motor temperature measurement, and determining a second temperature differential based on the difference between the second internal motor temperature measurement and the second external motor temperature measurement. Next, the method includes the steps of comparing the second temperature differential to the first temperature differential, and indicating a probability of scale accumulation on the electric motor if the second temperature differential is greater than the first temperature differential.

In another aspect, the present disclosure is directed to a method for operating an electric submersible pumping system that includes an electric motor and a motor drive. The method includes the steps of operating the electric submersible pumping system until it reaches a steady-state operating condition, obtaining a first internal motor temperature measurement, obtaining a first external motor temperature measurement and determining a first temperature differential based on the difference between the first internal motor temperature measurement and the first external motor temperature measurement. The method continues with the steps of obtaining a second internal motor temperature measurement, obtaining a second external motor temperature measurement, and determining a second temperature differential based on the difference between the second internal motor temperature measurement and the second external motor temperature measurement. The method continues with the steps of comparing the second temperature differential to the first temperature differential, indicating a probability of scale accumulation on the electric motor if the second temperature differential is greater than the first temperature differential, and automatically adjusting the operation of the electric submersible pumping system based on the indicated probability of scale accumulation on the electric motor. In some embodiments, the step of automatically adjusting the operation of the electric submersible pumping system includes automatically reducing the operating speed of the electric motor.

DETAILED DESCRIPTION

Figure 1:
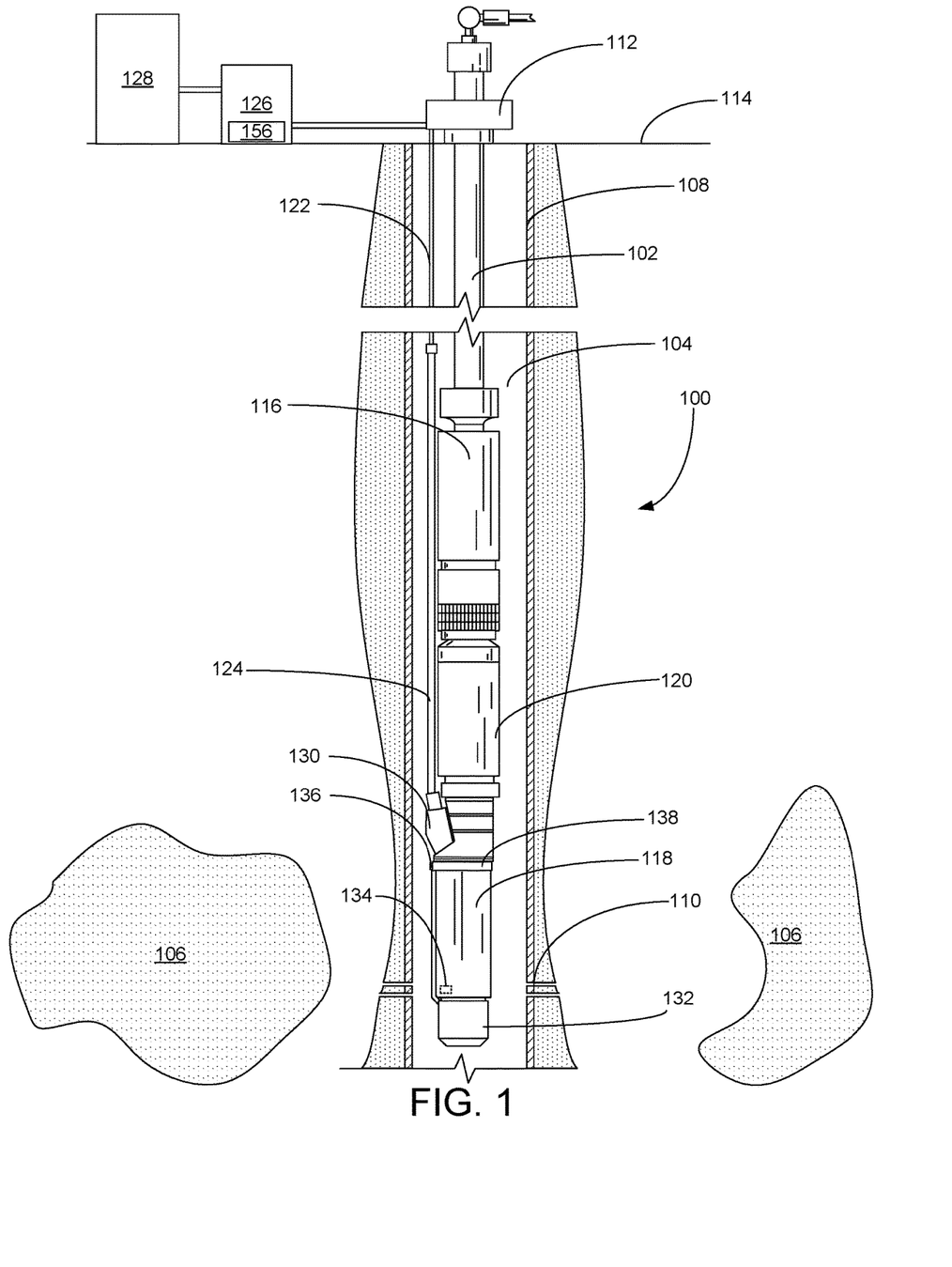
FIG. 1 is an elevational depiction of an electric submersible pumping system.

In accordance with an exemplary embodiment of the present invention, FIG. 1 shows a front view of a downhole pumping system 100 attached to production tubing 102. The downhole pumping system 100 and production tubing 102 are disposed in a wellbore 104, which is drilled for the production of a fluid such as water or petroleum from a subterranean geologic formation 106.

The wellbore 104 includes a casing 108, which has perforations 110 that permit the exchange of fluids between the wellbore 104 and the geologic formation 106. Although the downhole pumping system 100 is depicted in a vertical well, it will be appreciated that the downhole pumping system 100 can also be used in horizontal, deviated, and other non-vertical wells. Accordingly, the terms "upper" and "lower" should not be construed as limiting the disclosed embodiments to use in vertical wells.

The production tubing 102 connects the pumping system 100 to a wellhead 112 located on the surface 114, which may be onshore or offshore. Although the pumping system 100 is primarily designed to pump petroleum products, it will be understood that the present invention can also be used to move other fluids.

The pumping system 100 includes a pump 116, a motor 118 and a seal section 120. The motor 118 is an electric motor that receives its power from a surface-based supply through a power cable 122 and one or more motor lead extensions 124. In many embodiments, the power cable 122 and motor lead extension 124 are configured to supply the motor 118 with three-phase electricity from a surface-based variable speed (or variable frequency) motor drive 126, which receives electricity from a power source 128. The electricity is carried along separate conductors (not separately designated), which each correspond to a separate phase of the electricity. The motor lead extension 124 connects to the motor 118 through a connector 130, which is often referred to as a "pothead" connector. The motor lead extension 124 extends into the pothead 130, where it terminates in a connection to the conductor leads of the motor 118. The pothead connector 130 relieves mechanical stresses between the motor lead extension 124 and the motor 118, while providing a sealed connection that prevents the ingress of wellbore fluids into the motor 118, motor lead extension 124, or pothead 130.

The motor 118 converts the electrical energy into mechanical energy, which is transmitted to the pump 116 by one or more shafts. The pump 116 then transfers a portion of this mechanical energy to fluids within the wellbore 104, causing the wellbore fluids to move through the production tubing 102 to the surface 114. In some embodiments, the pump 116 is a turbomachine that uses one or more impellers and diffusers to convert mechanical energy into pressure head. In other embodiments, the pump 116 is a progressive cavity (PC) or positive displacement pump that moves wellbore fluids with one or more screws or pistons.

The seal section 120 shields the motor 118 from mechanical thrust produced by the pump 116. The seal section 120 is also configured to prevent the introduction of contaminants from the wellbore 104 into the motor 118, while also accommodating the thermal expansion and contraction of lubricants within the motor 118. Although only one pump 116, seal section 120 and motor 118 are shown, it will be understood that the downhole pumping system 100 could include additional pumps 116, seal sections 120 or motors 118.

The pumping system 100 also includes a gauge or sensor module 132 connected to the motor 118. As depicted in FIG. 1, the motor 118 is positioned between the sensor module 132 and the seal section 120. In other embodiments, the sensor module 132 can be located elsewhere in the pumping system 100, for example, between the motor 118 and the seal section 120. The sensor module 132 includes internal sensors and circuits for receiving and processing signals from remote sensors configured to measure operational and environmental conditions at the pumping system 100, as well as communications circuits for transmitting and receiving data from equipment located on the surface 114 or elsewhere in the wellbore 104.

Figure 2:
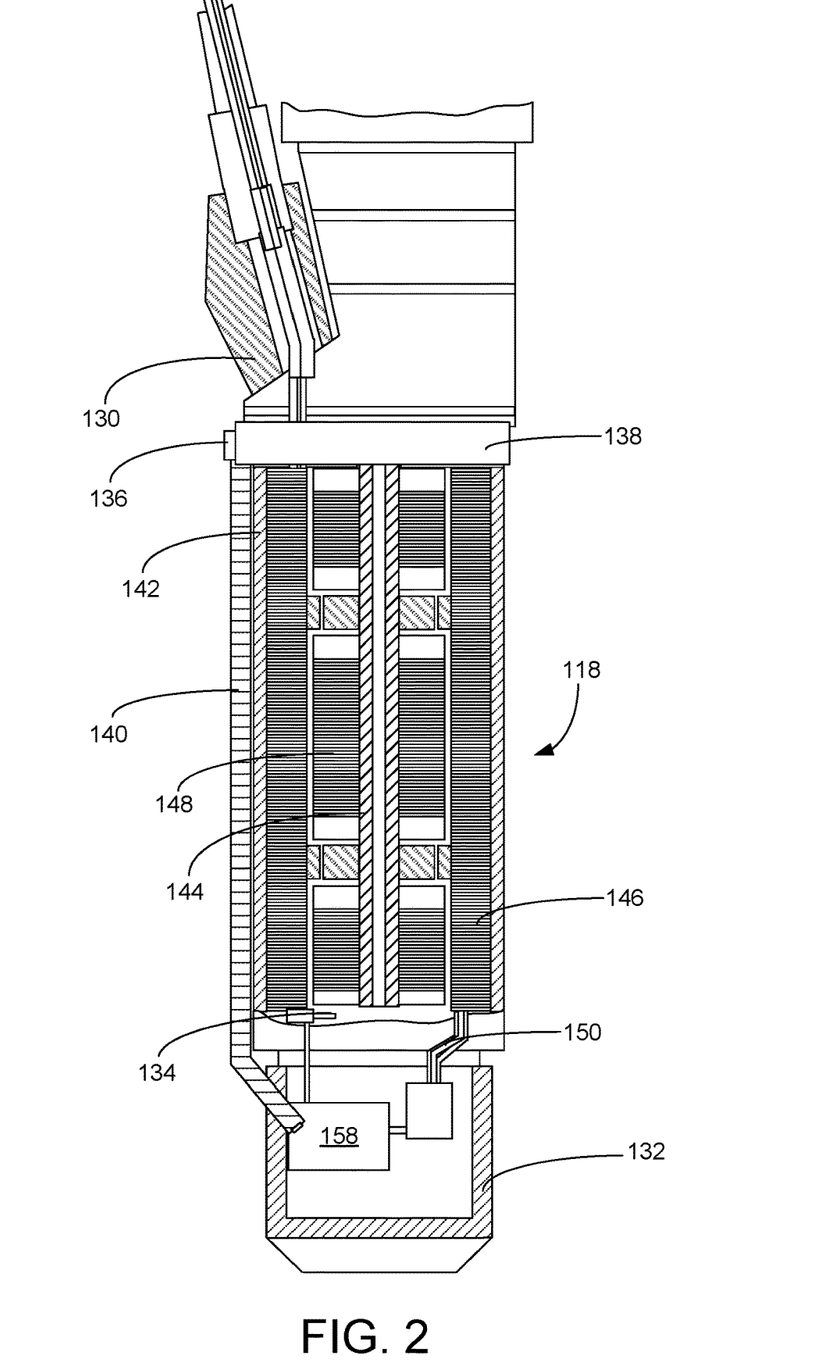
FIG. 2 is a cross-sectional depiction of the motor and pothead connector of the electric submersible pump of FIG. 1.

As illustrated in FIG. 2, the motor 118 includes a motor housing 142, a shaft 144, a stator assembly 146, and a rotor 148. The stator assembly 146 is located adjacent the interior surface of the motor housing 142 and remains fixed relative the motor housing 142. The stator assembly 146 includes a stator core that is formed by passing magnet wire through slots in a plurality of stacked and compressed laminates to form windings or coils.

The motor 118 includes a first motor temperature sensor 134 and a second motor temperature sensor 136. In exemplary embodiments, the first motor temperature sensor 134 is configured to measure the internal temperature of the motor 118 and can be attached to the stator assembly 146 or positioned elsewhere in the motor 118 in a position where it can remain immersed in, or in contact with, the motor fluid. In some embodiments, the first motor temperature sensor 134 is a thermocouple that detects the temperature of the motor lubricating oil or stator windings in the motor 118. The first motor temperature sensor 134 is configured to output a signal representative of the internal operating temperature of the motor 118 to a processing board within the sensor module 132.

In one embodiment, the second motor temperature sensor 136 is connected to an outside surface of the pumping system 100 and configured to measure the external temperature of the wellbore fluids surrounding the motor 118. As depicted in FIG. 2, the second motor temperature sensor 136 is located at a spaced apart distance from the first motor temperature sensor 134. In the embodiments depicted in FIGS. 1 and 2, the first motor temperature sensor 134 is located near the sensor module 132 and the second motor temperature sensor 136 is located near the pothead connector 130 and affixed to the exterior of the motor 118 with banding 138. As depicted in FIGS. 1 and 2, the output from the second motor temperature sensor 136 is conveyed to the sensor module 132 through an external sensor cable 140.

In other embodiments, the second motor temperature sensor 136 is also located inside the motor 118 and connected to the sensor module 132 with an internal sensor cable. In yet other embodiments, the second motor temperature sensor 136 is placed in a thermal well in the motor head and connected to the sensor module 132 with the external sensor cable 140. In each of these embodiments, the second motor temperature sensor 136 is advantageously positioned at a spaced apart distance from the first motor temperature sensor 136. For example, the second motor temperature sensor 136 can be located between the stator assembly 146 and the pothead 130, while the first motor temperature sensor 134 is located proximate the sensor module 132. In some embodiments, the motor 118 includes three or more temperature sensors that are configured to measure internal or external temperatures at different locations internal or external to the motor 118.

In each case, the first and second motor temperature sensors 134, 136 are configured to measure temperatures on a continuous or periodic basis and output responsive temperature measurement signals to the sensor module 132 through internal or external signal conductors. In this way, the first motor temperature sensor 134 is configured to measure the internal temperature of the motor 118, while the second motor temperature sensor 136 is configured to measure an internal or external temperature. Importantly, the first and second motor temperature sensors 134, 136 are spaced apart and configured to evaluate temperature differences along a length of the motor 118.

Figure 3:
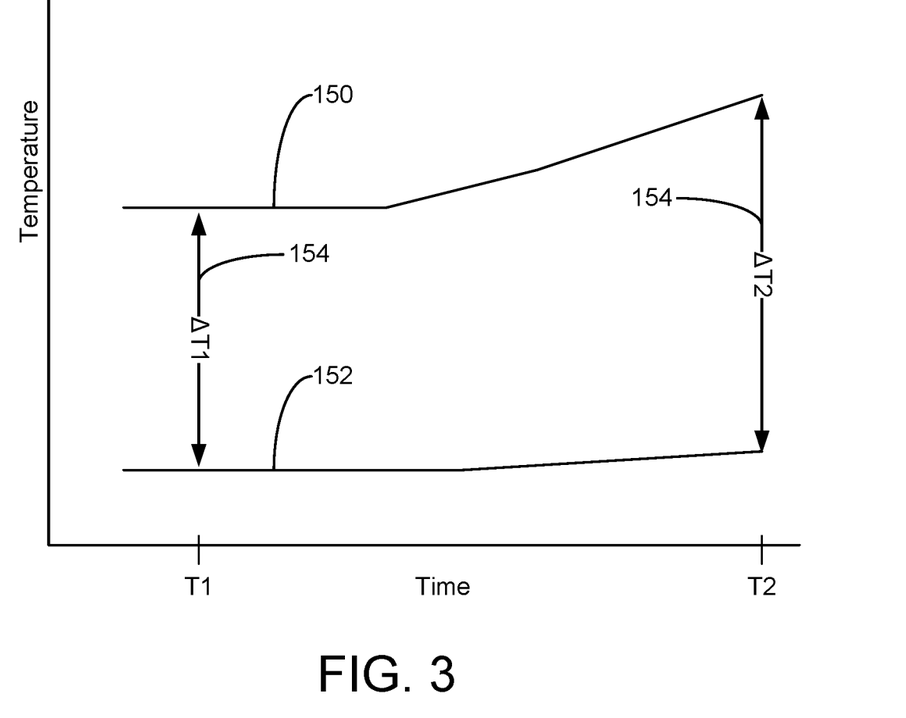
FIG. 3 is a differential temperature graph showing the divergence of temperature measurements over time.

Turning to FIG. 3, shown therein is a graph of the measured first sensor temperature 150 and second sensor temperature 152 over time. A temperature difference 154 is defined as the difference between the first sensor temperature 150 and the second sensor temperature 152. Once the pumping system 100 has achieved a steady-state operation condition and the temperature of the wellbore 104 is relatively stable, the temperature difference 154 should remain substantially the same across extended intervals. If, however, the temperature difference 154 begins to increase, this increase in the differential temperature could indicate the presence of scaling on the exterior surface of the motor 118. For example, if the first sensor temperature 150 reflects an internal temperature in the motor that increases at a rate (slope) that outpaces a corresponding increase in the external second sensor temperature 152, then the temperature difference ($\Delta_T$) will be greater at Time2 than at Time1 ($\Delta_{T2} > \Delta_{T1}$). The increasing temperature differential 154 suggests that scaling on the exterior of the motor 118 may be diminishing the convective cooling that would otherwise moderate the internal temperature of the motor 118.

In this way, an increase in the temperature differential 154 can provide an early indication that scaling is present. Based on this information, the operator of the pumping system 100 can evaluate intervention options, which may include chemical treatment (e.g., scale inhibitors) or adjusting the operation of the motor 118 to prolong the operational life of the pumping system 100.

Figure 4:
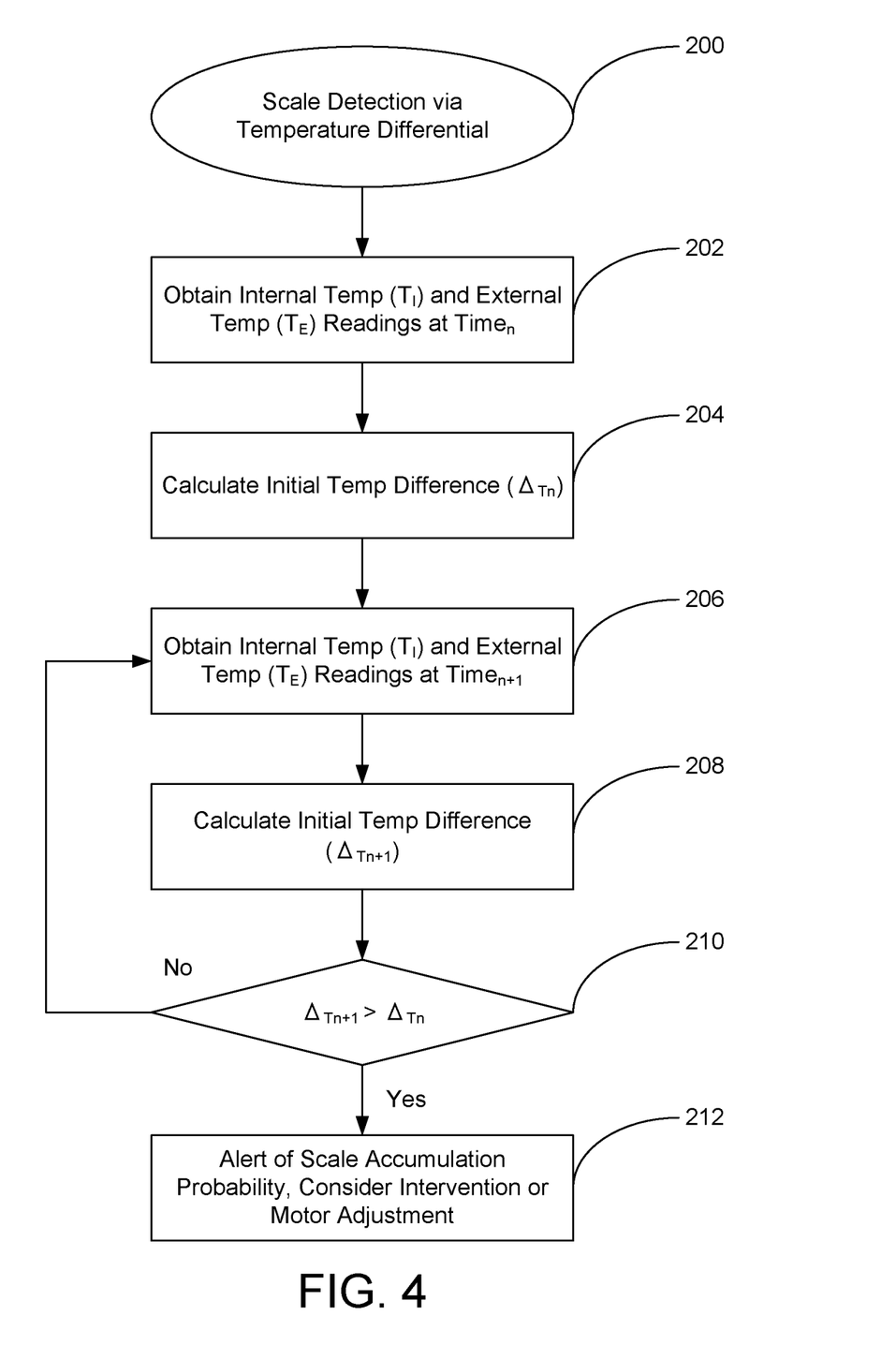
FIG. 4 is a process flow diagram illustrating a method of detecting scale accumulation based on temperature differentials.

Turning to FIG. 4, shown therein is a process flowchart for a method 200 for detecting scale accumulation on an electric submersible pumping system 100 using periodic temperature differential analysis. Although the method 200 refers to a temperature differential determined between an internal and an external temperature, it will be appreciated that the same method 200 could be applied to a temperature differential based on internal temperature measurements taken at spaced apart locations inside the motor 118. The method 200 can be configured as a computer-implemented process that is carried out by a computer or processor 156 located in the motor drive 126 or in other well control systems. In other embodiments, the method 200 is carried out by an onboard processor 158 located within the sensor module 132 or in another location within the pumping system 100.

At step 202, readings are taken for the internal motor temperature 150 (first sensor temperature) and external motor temperature 152 (second sensor temperature) at a first time ($Time_n$). These initial readings should be made after the pumping system 100 has achieved a sufficiently stable operating temperature. At step 204, an initial temperature differential ($\Delta_{Tn}$) is calculated as the difference between the internal temperature ($T_I$) and the external temperature ($T_E$). The calculation of the temperature differential can be based on discrete temperature measurements, or on a rolling average taken over a suitable interval.

At step 206, a second set of internal and external temperature readings are taken at some point after the initial readings ($Time_{n+1}$). At step 208, a subsequent temperature differential ($\Delta_{Tn+1}$) is calculated as the difference between the internal temperature ($T_I$) and the external temperature ($T_E$). Again, the calculation of the temperature differential can be based on discrete temperature measurements, or on a rolling average taken over a suitable interval.

At step 210, a determination is made about whether the subsequent temperature differential ($\Delta_{Tn+1}$) is greater than the earlier temperature differential ($\Delta T_n$). If the temperature differential ($\Delta_T$) has not changed, or has not changed beyond a threshold value (e.g., 5% or 10% of the initial temperature differential, $\Delta_T$), the method 200 returns to step 206. A subsequent set of internal and external temperature readings are taken and a new temperature differential ($\Delta_{Tn+2}$) is made and compared against the previous temperature differential ($\Delta_{Tn+1}$). The method 200 continues to loop through steps 206, 208 and 210 until the subsequent differential ($\Delta_{Tn+1}$) is larger than the previous temperature differential ($\Delta T_n$), or is larger beyond the threshold value (e.g., 5% or 10% of the initial temperature differential). At that point, the method 200 proceeds to step 212 when an alert is provided to the operator that scale accumulation may be present on the motor 118. The operator can then consider whether to take remedial action, which may include, for example, applying a scale inhibitor chemical treatment to the wellbore 104. The operator may also elect to reduce the output of the motor 118 to prevent an overheating condition that could reduce the anticipated operational lifespan of the pumping system 100.

In other embodiments, the motor drive 126 can be configured to automatically reduce the output of the motor 118 in response to an alert that scale accumulation may be present on the motor 118. The motor drive 126 can be configured to reduce the operating speed until the internal motor temperature 150 falls below a threshold value.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

It is claimed:

1. A method for operating an electric submersible pumping system that includes an electric motor and a motor drive, the method comprising the steps of:
   operating the electric submersible pumping system until it reaches a steady-state operating condition;
   obtaining a first internal motor temperature measurement;
   obtaining a first external motor temperature measurement;
   determining a first temperature differential based on the difference between the first internal motor temperature measurement and the first external motor temperature measurement;
   obtaining a second internal motor temperature measurement;
   obtaining a second external motor temperature measurement;
   determining a second temperature differential based on the difference between the second internal motor temperature measurement and the second external motor temperature measurement;
   comparing the second temperature differential to the first temperature differential; and indicating a probability of scale accumulation on the electric motor if the second temperature differential is greater than the first temperature differential.

2. The method of claim 1, wherein the step of comparing the second temperature differential to the first temperature differential comprises determining if the second temperature differential is greater than the first temperature differential by more than a threshold value.

3. The method of claim 2, wherein the threshold value is about 5% of the first temperature differential.

4. The method of claim 2, wherein the threshold value is about 10% of the first temperature differential.

5. The method of claim 1, wherein the step of determining the first temperature differential comprises finding the difference between the first internal motor temperature measurement and the first external motor temperature measurement, where the first internal motor temperature measurement and the first external motor temperature measurement are discrete values.

6. The method of claim 5, wherein the step of determining the second temperature differential comprises finding the difference between the second internal motor temperature measurement and the second external motor temperature measurement, where the second internal motor temperature measurement and the second external motor temperature measurement are discrete values.

7. The method of claim 1, wherein the step of determining the first temperature differential comprises finding the difference between the first internal motor temperature measurement and the first external motor temperature measurement, where the first internal motor temperature measurement and the first external motor temperature measurement are based on a rolling average of first internal motor temperature measurements and a rolling average of first external motor temperature measurements.

8. The method of claim 7, wherein the step of determining the second temperature differential comprises finding the difference between the second internal motor temperature measurement and the second external motor temperature measurement, where the second internal motor temperature measurement and the second external motor temperature measurement are based on a rolling average of second internal motor temperature measurements and a rolling average of second external motor temperature measurements.

9. The method of claim 7, wherein the step of determining the second temperature differential comprises finding the difference between the second internal motor temperature measurement and the second external motor temperature measurement, where the second internal motor temperature measurement and the second external motor temperature measurement are discrete values.

10. The method of claim 1, wherein the step of comparing the second temperature differential to the first temperature differential comprises:
finding an internal temperature slope determined as the rate at which the internal motor temperature increases between the first internal motor temperature measurement and the second internal motor temperature measurement;
finding an external temperature slope determined as the rate at which the external motor temperature increases between the first external motor temperature measurement and the second external motor temperature measurement; and
comparing the internal temperature slope to the external temperature slope.

11. The method of claim 10, wherein the first internal motor temperature measurement is taken at the same time as the first external motor temperature measurement.

12. The method of claim 11, wherein the second internal motor temperature measurement is taken at the same time as the second external motor temperature measurement.

13. The method of claim 1, further comprising the step of automatically adjusting the operation of the electric submersible pumping system based on the indicated probability of scale accumulation on the electric motor.

14. The method of claim 13, wherein the step of automatically adjusting the operation of the electric submersible pumping system comprises automatically reducing the operating speed of the electric motor.

15. A method for operating an electric submersible pumping system that includes an electric motor and a motor drive, the method comprising the steps of:
operating the electric submersible pumping system until it reaches a steady-state operating condition;
obtaining a first internal motor temperature measurement;
obtaining a first external motor temperature measurement;
determining a first temperature differential based on the difference between the first internal motor temperature measurement and the first external motor temperature measurement;
obtaining a second internal motor temperature measurement;
obtaining a second external motor temperature measurement;
determining a second temperature differential based on the difference between the second internal motor temperature measurement and the second external motor temperature measurement;
comparing the second temperature differential to the first temperature differential;
indicating a probability of scale accumulation on the electric motor if the second temperature differential is greater than the first temperature differential; and
automatically adjusting the operation of the electric submersible pumping system based on the indicated probability of scale accumulation on the electric motor.

16. The method of claim 15, wherein the step of automatically adjusting the operation of the electric submersible pumping system comprises automatically reducing the operating speed of the electric motor.

17. An electric submersible pumping system configured to produce fluids from a well, the submersible pumping system comprising:
a motor drive;
an electric motor driven by the motor drive;
a sensor module connected to the electric motor;
a first motor temperature sensor configured to monitor an internal temperature of the electric motor;
a second motor temperature sensor configured to monitor an external temperature of the electric motor; and
a processor configured to determine changes over time in a temperature differential calculated as the difference between the internal motor temperature and the external motor temperature and determine a probability of scale accumulation on the electric motor based on the changes over time in the calculated temperature differential.

18. The electric submersible pumping system of claim 17, wherein the second motor temperature sensor is spaced apart from the first motor temperature sensor.

19. The electric submersible pumping system of claim 17, wherein the motor drive is configured to automatically adjust the operating speed of the electric motor based on determined changes over time in the temperature differential between the internal motor temperature and the external motor temperature.

* * * * *